United States Patent
Oney et al.

(10) Patent No.: US 9,071,421 B2
(45) Date of Patent: Jun. 30, 2015

(54) ENCRYPTED CONTENT STREAMING

(75) Inventors: Adrian J. Oney, Woodinville, WA (US); Quintin S. Burns, Fort Mill, SC (US); Bryan Born, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 709 days.

(21) Appl. No.: 12/969,414

(22) Filed: Dec. 15, 2010

(65) Prior Publication Data

US 2012/0155639 A1 Jun. 21, 2012

(51) Int. Cl.
| | |
|---|---|
| H04L 29/06 | (2006.01) |
| H04L 9/08 | (2006.01) |
| H04N 21/2347 | (2011.01) |
| H04N 21/4405 | (2011.01) |
| H04N 21/4627 | (2011.01) |
| H04N 21/472 | (2011.01) |
| H04N 21/6334 | (2011.01) |
| H04N 21/8355 | (2011.01) |

(52) U.S. Cl.
CPC ............ *H04L 9/0822* (2013.01); *H04L 9/0836* (2013.01); *H04L 2209/603* (2013.01); *H04N 21/2347* (2013.01); *H04N 21/4405* (2013.01); *H04N 21/4627* (2013.01); *H04N 21/47202* (2013.01); *H04N 21/63345* (2013.01); *H04N 21/8355* (2013.01)

(58) Field of Classification Search
CPC ...................................................... H04L 9/0822
USPC .................................... 726/30, 26, 27, 28, 29
See application file for complete search history.

(56) References Cited

U.S. PATENT DOCUMENTS

| | | | | |
|---|---|---|---|---|
| 6,553,370 | B1 * | 4/2003 | Andreev et al. ........................ 1/1 |
| 7,010,125 | B2 | 3/2006 | Lotspiech et al. |
| 8,281,128 | B2 * | 10/2012 | Lee et al. ........................ 713/160 |
| 2002/0026327 | A1 * | 2/2002 | Kothari et al. .................... 705/1 |
| 2003/0048808 | A1 * | 3/2003 | Stahl et al. ..................... 370/487 |
| 2003/0083054 | A1 * | 5/2003 | Francesca et al. ............ 455/418 |

(Continued)

OTHER PUBLICATIONS

Trappe et al.; Key management and distribution for secure multimedia multicast; Published in: Multimedia, IEEE Transactions on; (vol. 5 , Issue: 4 ) pp. 544-557; Date of Publication : Dec. 2003; IEEE Xplore.*

(Continued)

*Primary Examiner* — Bradley Holder
(74) *Attorney, Agent, or Firm* — Julie Kane Akhter; Danielle Johnston-Holmes; Micky Minhas

(57) ABSTRACT

Encrypted content streaming is provided by a method comprising holding an encrypted content stream that is cryptographically encrypted from a content stream with a content key, and holding an encrypted content key that is cryptographically encrypted from the content key with one or more intermediate encryption keys. The method further comprises serving the encrypted content stream to a plurality of content consumption devices, wherein the encrypted content stream is embedded with a leaf license comprising the encrypted content key, and wherein the encrypted content stream is cryptographically decryptable by a content consumption device having a scalable root license providing one or more intermediate root keys from which the content consumption device derives the one or more intermediate decryption keys paired to the one or more intermediate encryption keys.

19 Claims, 7 Drawing Sheets

(56) References Cited

U.S. PATENT DOCUMENTS

| | | | |
|---|---|---|---|
| 2003/0108164 A1* | 6/2003 | Laurin et al. | 379/88.01 |
| 2003/0233540 A1* | 12/2003 | Banerjee et al. | 713/153 |
| 2004/0088557 A1* | 5/2004 | Malcolm et al. | 713/193 |
| 2004/0114762 A1 | 6/2004 | Medvinsky | |
| 2004/0196972 A1 | 10/2004 | Zhu et al. | |
| 2004/0248561 A1* | 12/2004 | Nykanen et al. | 455/414.2 |
| 2005/0066372 A1* | 3/2005 | Bertin | 725/114 |
| 2006/0277582 A1* | 12/2006 | Kiiskinen et al. | 725/89 |
| 2008/0255994 A1 | 10/2008 | Schnell et al. | |
| 2009/0077577 A1* | 3/2009 | Allegrezza et al. | 725/14 |
| 2009/0190753 A1* | 7/2009 | Watanabe et al. | 380/44 |
| 2009/0265561 A1 | 10/2009 | Bromley et al. | |
| 2009/0271319 A1 | 10/2009 | Bromley et al. | |
| 2010/0027792 A1* | 2/2010 | Bangma et al. | 380/239 |
| 2010/0172498 A1* | 7/2010 | Malcolm et al. | 380/237 |
| 2010/0195827 A1* | 8/2010 | Lee et al. | 380/200 |

OTHER PUBLICATIONS

Huang et al.; A key-chain-based keying scheme for many-to-many secure group communication; Published in: Journal ACM Transactions on Information and System Security (TISSEC) TISSEC Homepage archive vol. 7 Issue 4, Nov. 2004; pp. 523-552; ACM Digital Library.*

Champagne, et al., "Forward-Secure Content Distribution to Reconfigurable Hardware", Retreived at <<http://palms.princeton.edu/system/files/champagne_reconfig_08.pdf>>, International Conference on Reconfigurable Computing and FPGAs 2008, pp. 450-455.

"Advanced Access Content System", Retrieved at<<http://www.ask.com/wiki/Advanced_Access_Content_System>>, Aug. 13, 2010, pp. 4.

* cited by examiner

ENCRYPTED CONTENT STREAMING

BACKGROUND

Content streaming is becoming an increasingly common way for providing content to a client. In some cases, digital rights management (DRM) technologies such as encryption may be employed to control access to content. For the case of cryptographic encryption, the content may be cryptographically encrypted with a cryptographic key, and the encrypted content may then be streamed to the client. As such, the client must have the proper key to decrypt and consume the content. From a provider perspective, it may be desirable to stream the same encrypted content stream to all clients, and only those clients with the proper key(s) may decrypt and consume the content. Typically a content provider streams hundreds, if not thousands, of content streams, and a client subscribes to a particular subset of those content streams. As such, it may be challenging to efficiently manage key distribution to several clients and/or control access to selected content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, a method of streaming encrypted content is provided. The method includes holding an encrypted content stream that is cryptographically encrypted from a content stream with a content key, and holding an encrypted content key that is cryptographically encrypted from the content key with one or more intermediate encryption keys. The method further includes serving the encrypted content stream to a plurality of content consumption devices, wherein the encrypted content stream is embedded with a leaf license comprising the encrypted content key, and wherein the encrypted content stream is cryptographically decryptable by a content consumption device having a scalable root license providing one or more intermediate root keys from which the content consumption device derives the one or more intermediate decryption keys paired to the one or more intermediate encryption keys.

DETAILED DESCRIPTION

A server may stream hundreds, if not thousands or more, of encrypted content streams which may be variously grouped into content subscriptions. If each encrypted content stream is cryptographically encrypted (hereinafter, encrypted) with a different cryptographic key (hereinafter, key), then a user may need several keys in order to have the capability to decrypt all content streams associated with their subscription. Thus, it is desirable to have an efficient and scalable approach for delivering keys, as well as associated information such as content policy, group membership information, etc. to users. Further, it is desirable to deliver data so as to support changing of encryption and/or content policy in real time. In this way, a selected group of clients may, for example, be blocked from consuming content (e.g., during content blackout scenarios).

Therefore, embodiments are disclosed herein that relate to streaming encrypted content wherein each content stream includes an embedded encrypted content key encrypting the stream, and securely providing a content license to the client that includes intermediate decryption key(s) for decrypting selected encrypted content keys associated with the client's subscription. Further, such a license may be "scalable" in that it provides root key(s) from which the client can derive their intermediate decryption keys, thus reducing the number keys distributed to each client. Further yet, the intermediate decryption keys may be tied to various possible audiences thus allowing content to be encrypted and optionally blocked to selected audiences.

Figure 1:
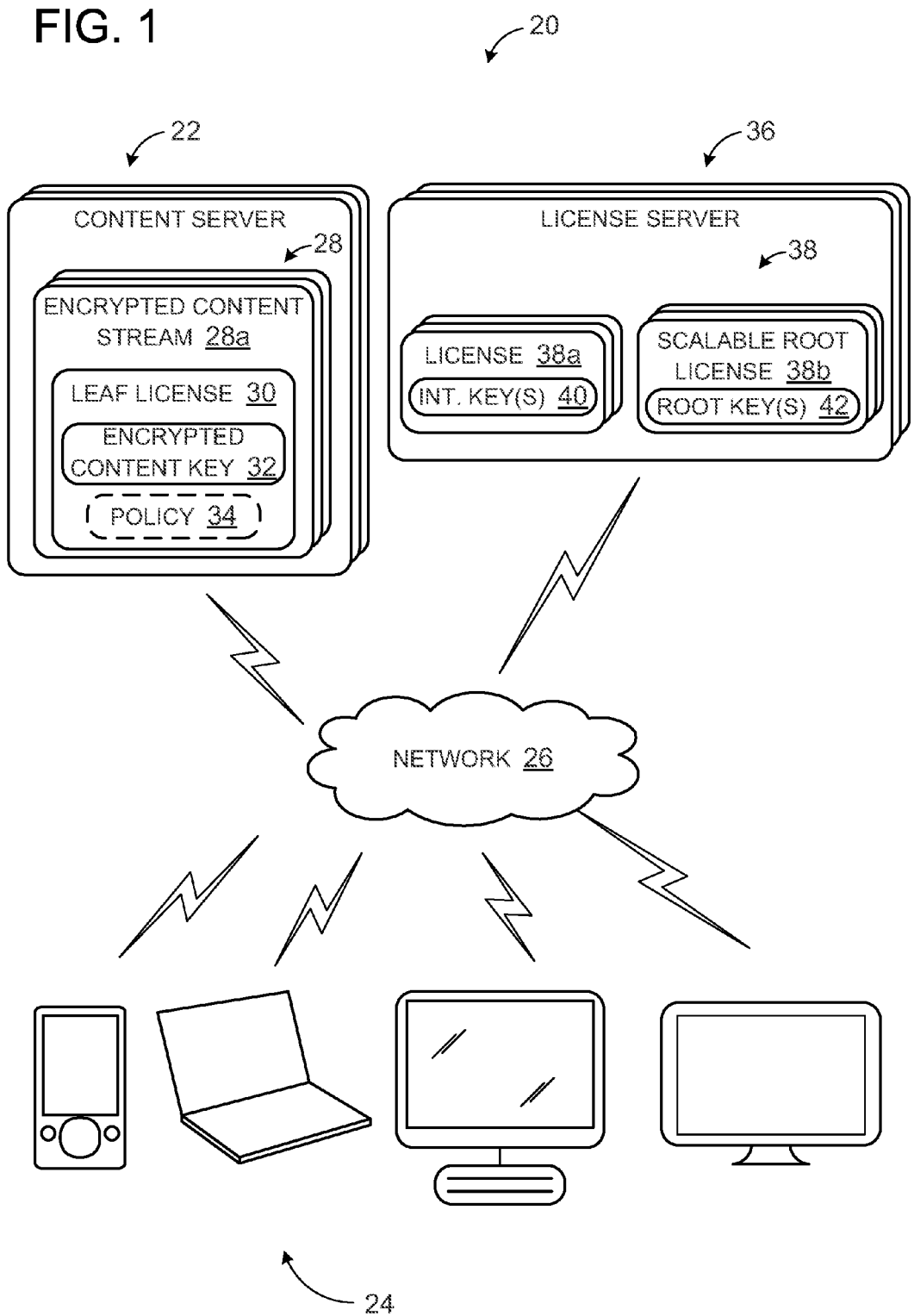
FIG. 1 shows an example environment for encrypted content streaming.

Turning now to FIG. 1, FIG. 1 illustrates an example content streaming environment 20 wherein a content server 22 is configured to stream content to one or more content consumption devices 24 via a network 26. It should be appreciated that content server 22 may include one or more server devices communicatively coupled with one another. Content consumption devices 24 may be any suitable devices configured to consume streamed content, such as personal computers, media players, mobile devices, gaming systems, set-top boxes, etc.

Content server 22 may be configured to serve content via network 26 in any suitable manner. For example, the content may be live linear content served via multicast delivery over network 26, such as traditional Internet protocol television (IPTV) on a managed network. As another example, content server 22 may provide "over-the-top" delivery of content over network 26 (e.g., over the Internet). As yet another example, content server 22 may provide video on demand (VOD) over network 26. It should be appreciated that these examples are illustrative and not intended to be limiting in any manner.

Content server 22 may be configured to serve content by hosting multiple channels (e.g., IPTV channels, content services, etc.), wherein each channel includes one or more content streams. For example, a channel may include two content streams such as a video stream and a corresponding audio stream. However, in some cases, additional audio streams (e.g., language tracks, etc.) and/or additional video streams (e.g., high-definition video, alternative views, etc.) may be included. In some embodiments, a single content stream, such as an audio-only stream or a video-only stream may be served.

Content server 22 may be configured to control access of one or more content consumption devices 24 to one or more of the content streams by serving content streams encrypted with one or more keys, depicted in FIG. 1 as encrypted content streams 28. As such, a content consumption device must have the proper key(s) in order to decrypt and consume an encrypted content stream. In this way, encrypting the content may mitigate unauthorized viewing.

As an example, FIG. 1 illustrates an example encrypted content stream 28*a* which is formed by encrypting a content stream with a content key. Each stream may be encrypted with a different content key. However, for the case of channels having more than one stream, each stream of the channel may optionally be encrypted with a same content key.

Whereas traditionally content keys may be encrypted and provided to content consumption devices 24 separate from the serving of encrypted content streams, content server 22 is configured to provide each encrypted content stream with its corresponding encrypted content key. The encrypted content key may be provided with the encrypted stream in any suitable manner. As an example, FIG. 1 shows example encrypted content stream 28*a* embedded with a leaf license 30. Leaf license 30 includes the encrypted content key 32 associated with encrypted content stream 28*a*. The embedded leaf license 30 may include additional information, such as a content policy 34 for the content stream, mitigations against tampering with the policy and/or the encrypted content key, etc. By serving content in this way, content server 22 may advantageously utilize a same distribution method for distributing the content keys as utilized for distributing the content itself. Further, content server 22 may provide real-time changes of content encryption and/or content policy by changing the encrypted content key and/or content policy at any suitable point within the stream, as described in more detail herein. Such suitable points may be dictated by where a content consumption device can tune into the stream based on a codec, container format, etc.

It should be appreciated that the leaf license may be embedded in any suitable manner. In some embodiments, such as when the content stream is an MP4 file, embedding the leaf license may comprise embedding encrypted content keys and tamper resistant content policy in ISO Part 12 Movie Fragment boxes. Tamper resistant policy and encrypted content keys may also be embedded in ISO Part 12 Movie Fragment boxes (e.g., 'moof' boxes in MP4) so that fragmented MP4 files have similar constructs for live streaming and key rotation. In other embodiments, such as when the content stream is an MPEG2 transport stream, such a stream may describe specific structures for holding key material and policy data (e.g., Entitlement Control Messages (ECMs)), and therefore embedding leaf licenses as described herein may therefore support mapping to such a container.

Further, embedded copies of the leaf license may be embedded and temporally spaced-apart within the encrypted content stream to accommodate one or more of the plurality of content consumption devices just joining the encrypted content stream.

It should be appreciated that in some embodiments the key used for encrypting the content stream may be different than, but related to, the key used for decrypting the encrypted content steam. For example, a content stream may be encrypted with a content encryption key to form the encrypted content stream, and the encrypted content stream may be decrypted with a content decryption key which is paired to the content encryption key. In such a case, the content decryption key is the key which is encrypted and provided in the leaf license. However, in other embodiments, the content key used for encrypting and decrypting the content stream may be the same key (in other words, the content encryption key is the same as the content decryption key).

By serving encrypted content streams each embedded with a leaf license including its corresponding encrypted content key, content server 22 may serve the same encrypted content streams 28 to all content consumption devices 24. Access is then controlled in that in order for a content consumption device to be able to decrypt and consume the content, the content consumption device must be capable of decrypting the encrypted content key in the leaf license before using the decrypted content key to decrypt the encrypted content stream. A content consumption device may be afforded such capabilities via a licensing process wherein the content consumption device subscribes to a particular subset of content streams (e.g., via a subscription), and in return, is provided with the appropriate keys for decrypting the encrypted content keys corresponding to the content to which they are subscribed.

Each content key encrypting a content stream may itself be encrypted in any suitable manner, such as by one or more other keys (e.g., intermediate encryption keys). In such a case, intermediate decryption keys paired to the intermediate encryption keys are provided to content consumption devices (e.g., via a license server) upon registration for a particular content subscription. Since intermediate decryption keys may be issued to the content consumption device based on a subscription, the content consumption device thus receives only the intermediate decryption keys to which it is entitled. In other words, if the content consumption device is not authorized to view certain content streams, they will not receive the intermediate decryption keys for decrypting content keys of those streams, and thus will not be capable of consuming those streams.

It should be appreciated that in some embodiments an intermediate encryption key may be different than, but related to, the intermediate decryption key to which it is paired. However, in other embodiments, the intermediate key used for encrypting and decrypting the content stream may be the same key.

Intermediate decryption keys may be provided to one or more content consumption devices 24 in any suitable manner. FIG. 1 illustrates an example scenario wherein a license server 36 is configured to serve licenses 38 via network 26. License server 36 may be further configured to provide leaf licenses to content server 22. In some embodiments, content server 22 may indicate to license server 36 which intermediate keys to use for encrypting the content key in the leaf license (e.g., based on the channel, geographic restrictions, etc.). In other embodiments, content server 22 may send a program identifier to license server 36 for determining which intermediate keys to use. It should be appreciated that license server 36 may include one or more server devices communicatively coupled with one another. It should be further appreciated that network 26 is shown in FIG. 1 for illustrative purposes and is not intended to be limiting in any way. Thus, in some embodiments, content server 22 and license server 36 may serve content and licenses, respectively, over different networks. Further, in some embodiments, content server 22 and license server 36 may be the same device and/or may be communicatively coupled with one another.

The intermediate decryption keys may, for example, correspond to a channel, such that each channel is encrypted with a content key which is encrypted with an intermediate encryption key (e.g., a channel encryption key) paired to a corresponding intermediate decryption key (e.g., a channel decryption key). As another example, intermediate decryption keys may correspond to various audiences, wherein different audiences receive different intermediate decryption keys. Such audiences may be predetermined based on any suitable criteria such as geographical regions, subscription levels, etc. Since access to content may be ultimately controlled by the intermediate decryption keys provided to the content consumption device, such audiences may be utilized to control which audiences can access which content.

In some embodiments, license server 36 may serve a license such as example license 38a which includes one or more intermediate decryption keys 40 provided to a particular one of the content consumption devices 24. However, since each subscription may include hundreds of streams, and therefore hundreds of intermediate decryption keys, license server 36 may instead serve a license such as a scalable root license 38b which includes intermediate root keys 42 from which the content consumption device may derive intermediate decryption keys 40. As such, license server 36 may reduce the amount of keys it serves, and thus reduce its computational, bandwidth, and/or storage expense. The intermediate decryption keys may be related to the intermediate root keys via a hierarchical key tree. The content consumption device is then configured with the capability for deriving their intermediate decryption keys from their root intermediate keys of their scalable root license. It should be appreciated that the license server may be configured to securely serve intermediate decryption keys via cryptographic sharing, such that unwanted content consumption devices and/or audiences cannot use such keys. It should also be appreciated that a scalable root license may include any type of intermediate keys, including intermediate keys corresponding to leaf nodes in the hierarchical key tree and/or intermediate keys corresponding to other nodes in the hierarchical key tree—herein referred to as intermediate root keys.

Figure 2:
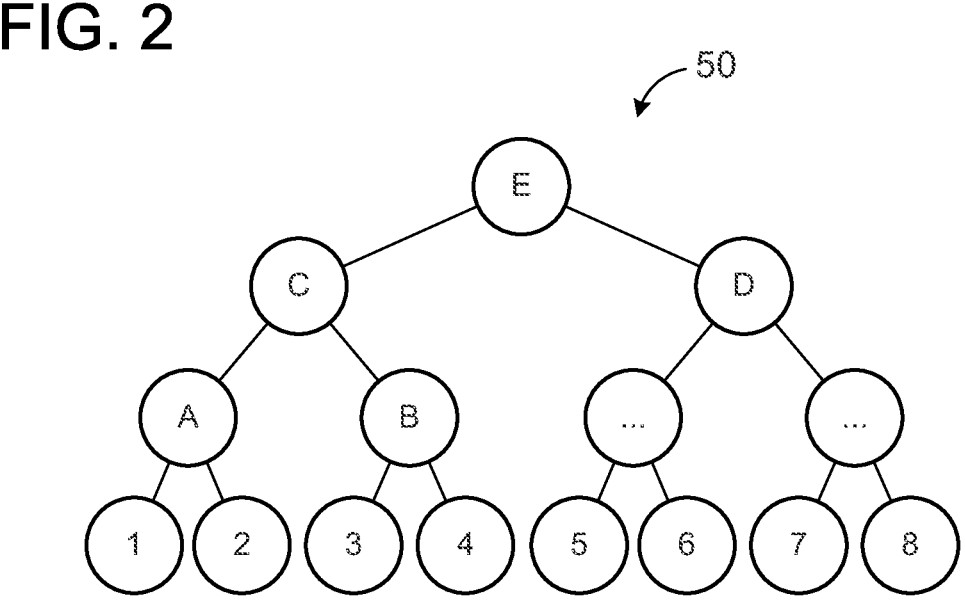
FIG. 2 shows an example hierarchical key tree in accordance with an embodiment of the present disclosure.

FIG. 2 illustrates an example hierarchical key tree 50 for eight example services (e.g., channels). In this example, each service has a corresponding intermediate decryption key represented by the nodes of key tree 50 which are labeled 1-8. As an example, a first service may be encrypted using a content key, and the content key may then be encrypted with an intermediate encryption key 1 paired to intermediate decryption key 1 of key tree 50. Likewise, a second service may be encrypted using another content key, and that content key may then be encrypted with an intermediate encryption key 2 paired to intermediate decryption key 2 of key tree 50, etc. As a possible use scenario, a user may subscribe to both the first and second services. Rather than serving intermediate decryption keys 1 and 2 to the client, the server may instead serve an intermediate root key "A," from which the client can derive intermediate decryption keys 1 and 2. As another example, if a client has subscribed to services 5-8, then the server may serve the client intermediate root key "D."

It should be appreciated that leaf licenses may still be encrypted at the service level as opposed to the root level. In other words, each leaf license may still include a content key encrypted by an intermediate encryption key (e.g., as opposed to an intermediate root key). As such, upon obtaining an encrypted stream of their subscription, such as example encrypted content stream 28a, the content consumption device may derive the desired intermediate decryption key from their intermediate root keys 42 of scalable root license 38b, and upon obtaining the intermediate decryption key, decrypt encrypted content key 32 within leaf license 30.

It should be appreciated that the key tree may be organized in any suitable manner, and that particular orderings may dramatically reduce the number of keys transferred by the server. For example, such an ordering may be constructed using channel packages and/or aggregate data from the customer database. Further, in some embodiments, the key tree may incorporate keys associated with audiences based on any suitable criteria, as described in more detail with reference to FIGS. 6-7.

Figure 3:
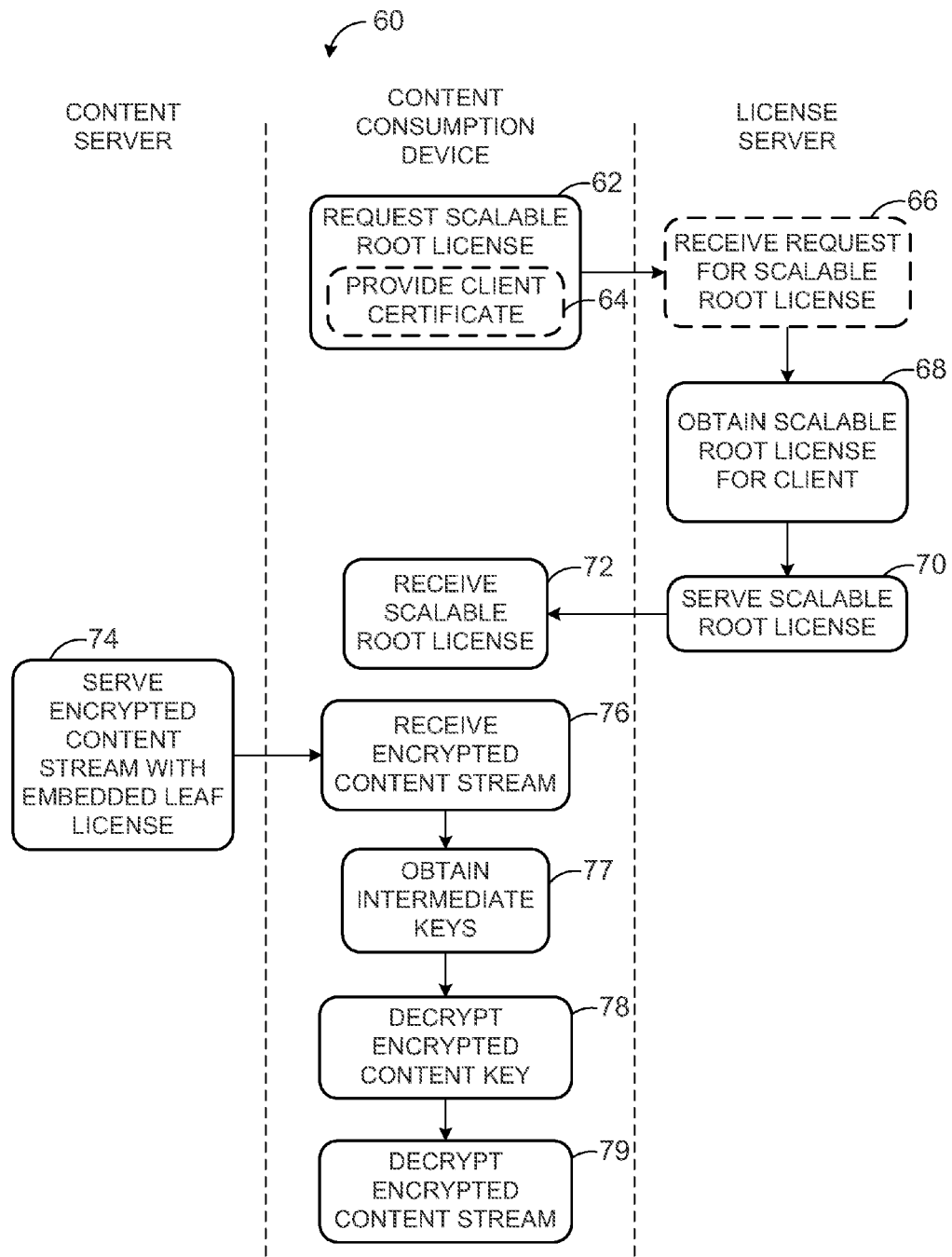
FIG. 3 shows an example method of encrypted content streaming in accordance with embodiments of the present disclosure.
Figure 4:
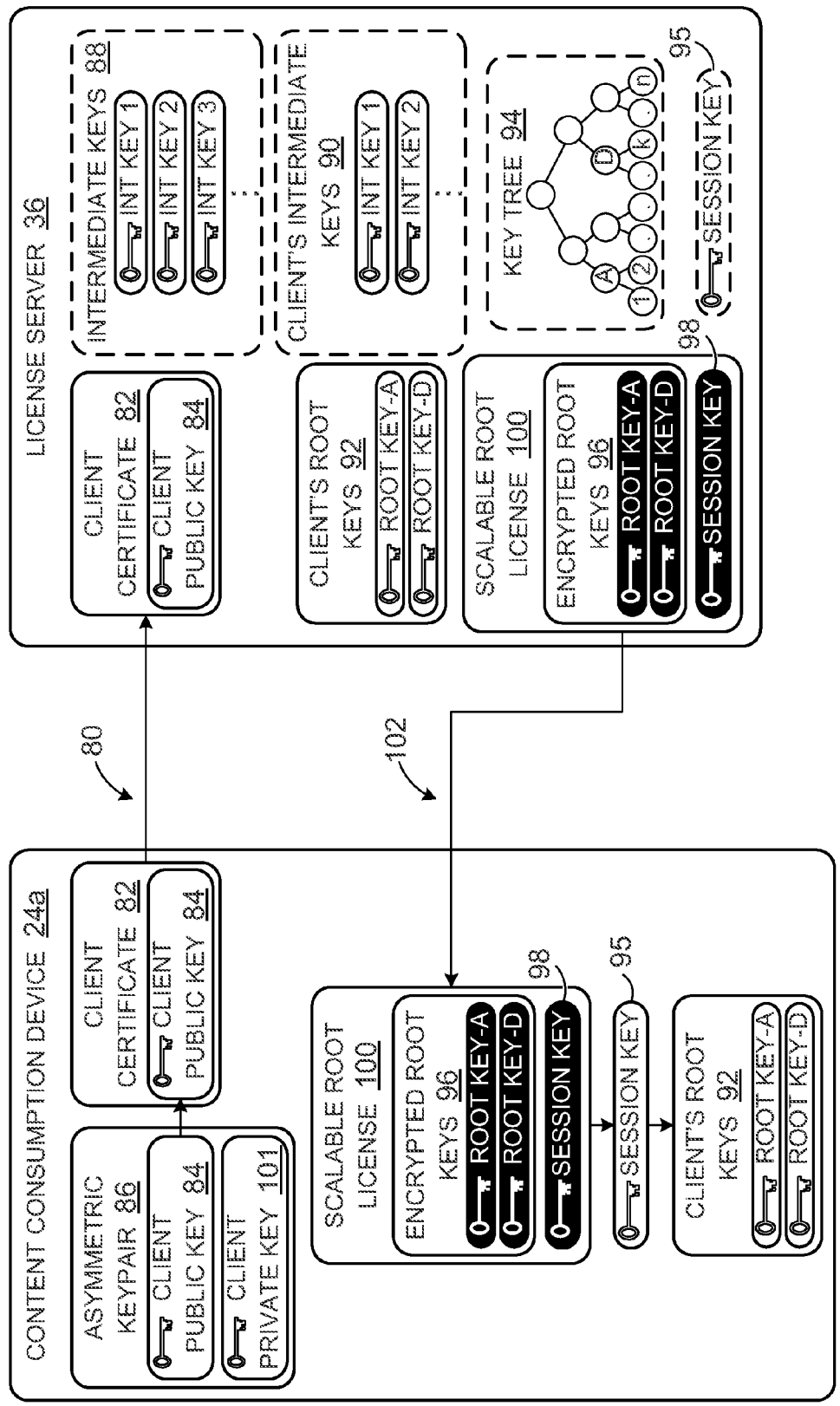
FIG. 4 shows an example use scenario in accordance with an embodiment of the present disclosure.

FIG. 3 illustrates an example method 60 of serving a scalable root license. At 62, the content consumption device submits a request for a scalable root license. In some embodiments, the content consumption device may do so, for example, after powering up to gain access to a subset of content streams associated with a particular content subscription. Further, in some embodiments, the content consumption device may provide its client certificate when submitting this request, as indicated at 64. The client certificate may include the client's public key of its asymmetric public/private keypair. FIG. 4 illustrates an example use scenario, wherein a content consumption device 24a sends a content subscription request as indicated at 80, wherein the request includes a client certificate 82 including a public key 84 of the client's asymmetric keypair 86.

It should be appreciated that in some embodiments, the client certificate may be a device certificate associated with the content consumption device, and the public key may then be a public key corresponding to that device. However, in some embodiments, the client certificate may be a domain certificate corresponding to a domain to which the content consumption device belongs. As such, the public key may then be a public key associated with that domain. By providing the client certificate with the request, the public key can then be utilized for encrypting and securely serving the scalable root license to the client, described in more detail as follows.

Continuing with FIG. 3, at 66 the license server receives the request for the scalable root license. In some embodiments the license server may receive the request directly from the content consumption device. However, in other embodiments, the request may be sent to another server which then provides the request to the license server.

Upon obtaining the request, the license server then obtains the scalable root license for the client, as indicated at 68. The license server may be configured to obtain the scalable root license in any suitable manner. For example, as illustrated in FIG. 4, license server 36 may hold a plurality of intermediate decryption keys 88 paired to a plurality of intermediate encryption keys capable of encrypting content keys capable of encrypting content streams. The license server may then identify which intermediate decryption keys 90 of the plurality of intermediate decryption keys 88 correspond to the client's subscription.

Upon determining the client's intermediate decryption keys 90, license server 36 may then determine which intermediate root keys 92 to provide in the license, from which the content consumption device can then derive its intermediate decryption keys. In doing so, the license server may utilize a key tree, such as example key tree 94. In the illustrated example, the client's intermediate decryption keys 90 are derivable from Intermediate Root Keys A and D, for example.

Returning to the method of FIG. 3, upon obtaining the scalable root license for the content consumption device, the license server may then securely serve (e.g., via cryptographic sharing) the scalable root license including the intermediate root keys, as indicated at 70. The content consumption device may then receive (e.g., via cryptographic sharing) the scalable root license as indicated at 72.

It should be appreciated that the license server may securely serve the scalable root license in any suitable manner. As an example, the intermediate root keys may be tied to the client's public key, either by directly binding the intermediate decryption keys to the client's public key, or by indirectly binding the intermediate decryption keys via another key, such as a session key. For example, as illustrated in FIG. 4, the client's intermediate root keys 92 may be encrypted with a session key 95 to form encrypted intermediate root keys 96. The session key 95 may then be encrypted with the client's public key 84 to form an encrypted session key 98. A scalable root license 100 including encrypted intermediate root keys 96 and encrypted session key 98 may then be served to content consumption device 24a, as indicated at 102.

Upon receiving scalable root license 100, content consumption device 24a may then use its private key 101 to decrypt encrypted session key 98 to obtain session key 95. Content consumption device 24a may then use session key 95 to decrypt encrypted intermediate root keys 96 to the client's intermediate root keys 92.

It should be appreciated that the session key may be symmetric in that the session key used for encrypting the intermediate root keys may be trivially related or identical to the session key used for decrypting the encrypted intermediate root keys. In the case that such a symmetric session key is utilized for binding the intermediate root keys to the client's public key, the symmetric session key is to be unique to each client. This assures that the intermediate decryption keys issued to a particular client cannot be shared with another client. For example, a client obtaining an intermediate decryption key associated with a premium movie channel via cryptographic sharing would not be capable of giving this intermediate decryption key to another subscriber who has not paid for the channel. As a nonlimiting example, a symmetric session key may be randomly generated for the client.

Further, it should be appreciated that the content consumption device may request its intermediate decryption keys based on any suitable criteria. For example, in some embodiments, the client may periodically send a request for its intermediate decryption keys (e.g., every eight hours), and in response, receive an updated license (e.g., a scalable root license, etc.) with an updated set of intermediate decryption keys and/or updated content policy, etc. As another example, the client may be triggered (e.g., by an application, etc.) to request its intermediate decryption keys. As yet another example, a content consumption device may request its intermediate decryption keys at start-up, or before a useful period of the existing intermediate decryption keys expires, for example.

Further yet, it should be appreciated that such intermediate decryption keys may be issued to a content consumption device in one or more licenses. For example, although issuing the intermediate keys in fewer licenses may offer greater efficiency (e.g., fewer client and server operations), in some embodiments it may be advantageous to split up the intermediate keys into different sets. As an example, multiple licenses may allow for intermediate keys to be obtained at different rates. For example, a channel key encrypting a movie on a premium movie service may rotate every two hours whereas channel keys encrypting content on other channels may rotate every eight hours.

Figure 5:
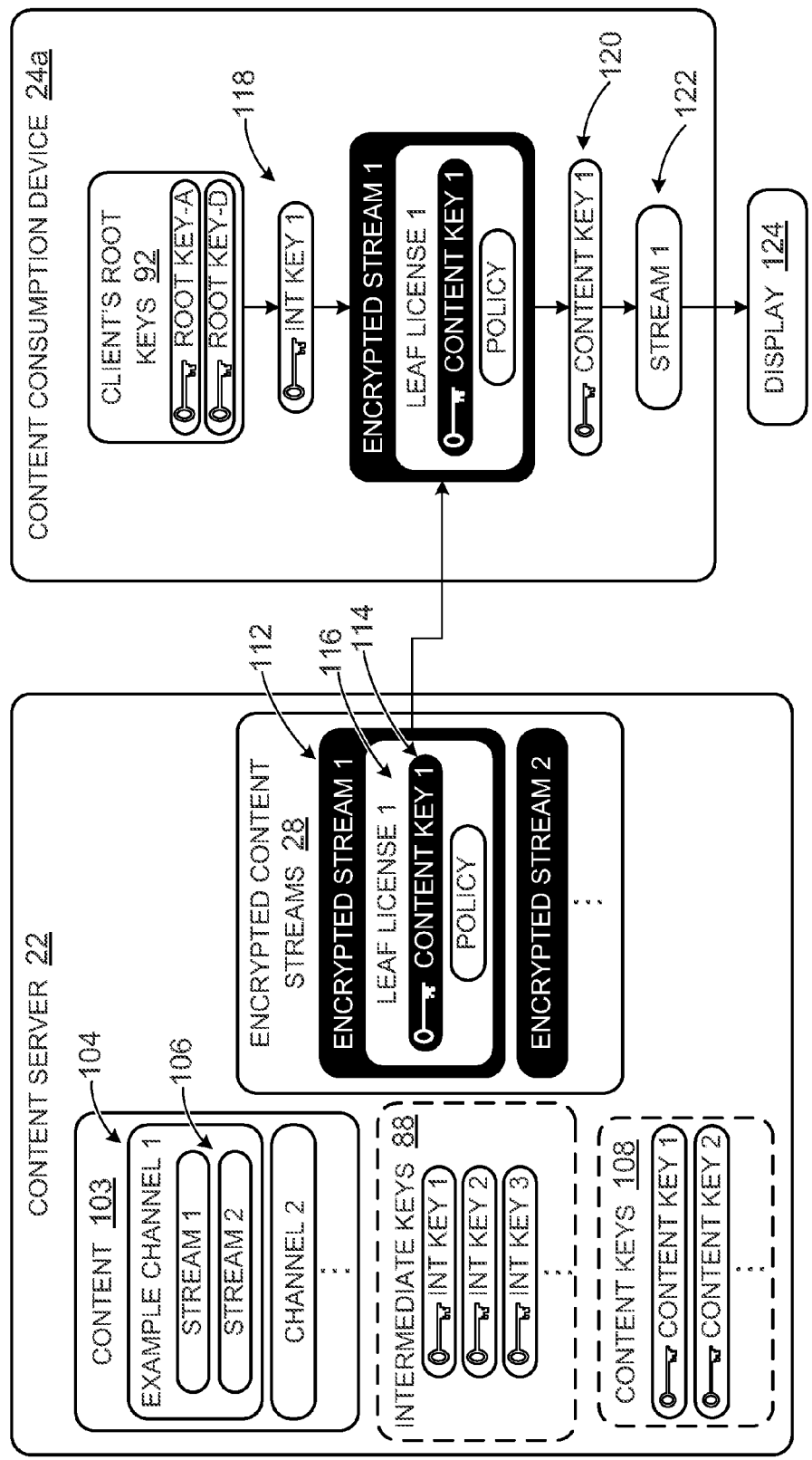
FIG. 5 shows another example use scenario in accordance with an embodiment of the present disclosure.

Returning to FIG. 3, a content server may securely stream content to a plurality of content consumption devices, as indicated at 74. As illustrated in the example of FIG. 5, content server 22 may hold content 103 including a plurality of channels (e.g., Channel 1, Channel 2, etc.) as indicated at 104, wherein each channel includes one or more content streams. As an example, Channel 1 includes two streams, namely Stream 1 and Stream 2 as indicated at 106. Each content stream of channels 104 is encrypted with a content key selected from a plurality of content keys 108 to form an encrypted content stream of encrypted content streams 28. For example, Stream 1 may be encrypted with Content Key 1 to form Encrypted Content Stream 1, as indicated at 112.

The encrypted content key and content policy for each stream may then be included in a leaf license embedded within the stream, as indicated at 114 and 116. Each encrypted stream embedded with a leaf license may then be served to one or more content consumption devices such as content consumption device 24a.

Returning to the method of FIG. 3, the content consumption device then receives the encrypted content as indicated at 76. In some embodiments, the server may stream the same content to several content consumption devices. In such a case, a content consumption device may receive a plurality of encrypted content streams including streams other than those to which they subscribe. The client may then obtain its intermediate decryption keys from its scalable root license for decrypting and consuming content associated with its subscription, as indicated at 77.

In the example of FIG. 5, content consumption device 24a subscribes to Stream 1, and therefore has been indirectly provided (via scalable root license 100) with Intermediate Encryption Key 1 utilized for decrypting Encrypted Content Key 1. Content consumption device 24a then obtains Intermediate Decryption Key 1 from its intermediate root keys 92. Content consumption device 24a may do so via any suitable manner, such as by key derivation, as indicated at 118. It should be appreciated that this example is illustrative and not meant to be limiting in any way. As described above, in some embodiments, Stream 1 may be one of a plurality of encrypted content streams collectively constituting a channel to which the content consumption device subscribes.

As such, a client obtains just the intermediate decryption key it needs for that particular stream, rather than having to perform key derivations to obtain all of their intermediate keys at once. However, it should be appreciated that in some embodiments, it may instead be desirable for a client to derive multiple intermediate decryption keys when performing key derivation.

Returning to the method of FIG. 3, upon obtaining the desired intermediate decryption key, the content consumption device may then decrypt the encrypted content key, as indicated at 78. The content consumption device may then use the decrypted content key to decrypt the content stream, as indicated at 79. As illustrated in the example of FIG. 5, upon obtaining Intermediate Decryption Key 1, content consumption device 24a may then decrypt Encrypted Content Key 1 to obtain Content Key 1, as indicated at 120. Content consumption device 24a may then decrypt Encrypted Content Stream 1 with Content Key 1 to obtain decrypted Stream 1, as indicated at 122. As such, content consumption device 24a may then consume decrypted Stream 1 and output the stream to a display 124, for example.

Encrypted content streaming as described herein, wherein each stream has an embedded leaf license including the encrypted content key and policy for the stream, allows the content server to optionally change encryption and/or policy in real time. For example, the content server may invoke such real-time changes to encryption and/or policy to block content to a particular subset of users in a just-in-time scenario. In particular, by changing one or more intermediate encryption keys utilized to encrypt the content key of a particular stream and updating the embedded leaf license accordingly, the content server may change which content consumption devices are capable of decrypting the key based on which content consumption devices are served the one or more intermediate decryption keys paired to the one or more intermediate encryption keys. Further, in some embodiments, the updated leaf license may be served "early" by being embedded within the encrypted stream in addition to the original embedded leaf license.

Further, since intermediate encryption/decryption keypairs may be associated with any suitable criteria, such as channels, subscription levels, geographical regions, etc. and/or any combination thereof, effecting such real-time changes to content key encryption may change which content consumption devices associated with the criteria are capable of decrypting the key and consuming the content.

As a nonlimiting example, intermediate keypairs such as blackout keypairs may be utilized to block a specific audience or audiences from decrypting and consuming content. In such a case, each blackout decryption key may correspond to a different audience of a plurality of possible audiences. Licensing protocol may dictate, for example, that content consumption devices of a particular audience may receive blackout decryption keys for all other audiences but not receive the blackout decryption key for their own audience. As such, any content key encrypted with the blackout encryption key paired to the blackout decryption key of the device's own audience is thus unable to be decrypted by that content consumption device—because that content consumption device does not receive the blackout decryption key for that device's audience. In other words, content may be blocked to such an audience by encrypting a content key with the blackout encryption key paired to the blackout decryption key of the device's audience, which the device's audience does not receive. It should be appreciated that in some embodiments, such blackout encryption keys may be utilized in addition to other types of intermediate keys to encrypt a content key, such as channel keys, etc.

As a possible use scenario, a content stream may be blocked to content consumption devices associated with a particular Audience X as follows. The content stream may be encrypted with a content key which is then encrypted with a blackout encryption key. The blackout encryption key is paired to a blackout decryption key provided (e.g., via content licenses) to audiences other than Audience X. As such, content consumption devices associated with Audience X are not served the blackout decryption key. The content server may then stream the encrypted stream embedded with a leaf license including the encrypted content key to consumption devices of all audiences. Content consumption devices associated with audiences other than Audience X, which have received the blackout decryption key within their content license, may then decrypt the encrypted content key, and use the obtained content key to decrypt and consume the content. However, content consumption devices associated with Audience X, which have not received the blackout decryption key within their content license, are unable to decrypt the encrypted content key, and thus cannot consume the content.

It should be appreciated that in some blackout scenarios, content consumption devices receiving content to which they do not have the appropriate blackout decryption keys to consume may in some embodiments be directed to other content which they are able to consume.

Blackout decryption keys may be provided to a content consumption device via a content license served by a license server, such as license server 36. For example, out of a plurality of possible candidate blackout decryption keys, a subset of blackout decryption keys may be selected for the content consumption device based on the audience with which the content consumption device is associated. Such a subset excludes the blackout decryption key associated with the content consumption device's audience.

In some embodiments, the subset of blackout decryption keys may be provided directly within a license served to the content consumption device. However, in some embodiments, blackout root keys may be provided within a scalable root license served to the content consumption device, from which the content consumption device may then derive its subset of blackout decryption keys. In such a case, the blackout decryption keys may be related to the blackout root keys via a hierarchical key tree.

In some embodiments, subset difference trees may be utilized to organize blackout decryption keys within such a key tree. Thus, whereas traditionally a secure SOC may be relied upon to make a binary decision on whether a client is blocked from consuming content, encrypted content streaming as described herein may utilize subset difference trees such that clients that are blacked out do not have all of the cryptographic key material necessary to get access to the content key. Thus, whereas traditional bit flags may be easily hacked and/or compromised, the encrypted content streaming as described herein provides cryptographic security in that the client is just not served all the cryptographic key material and thus is incapable of accessing the content key.

Figure 6A:
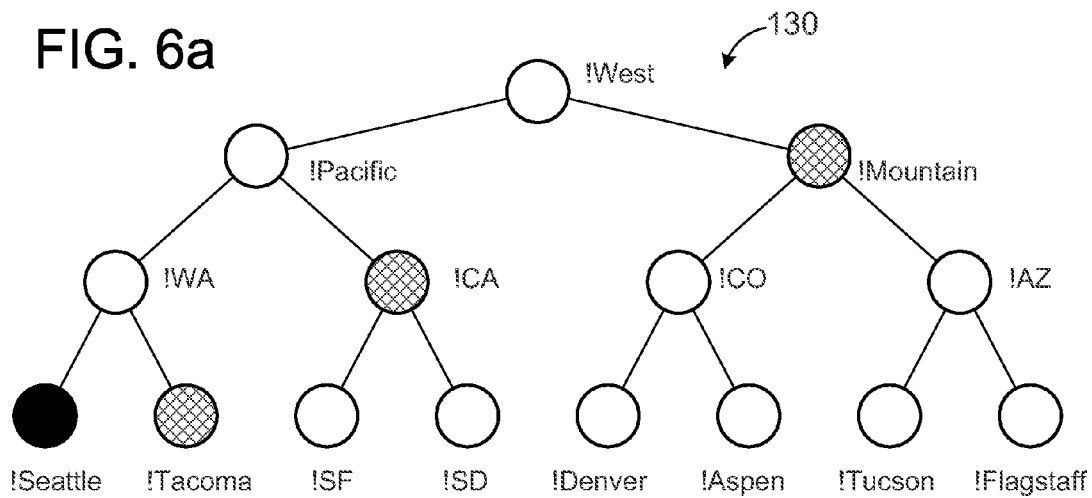
FIGS. 6A and 6B show another example hierarchical key tree in accordance with an embodiment of the present disclosure.

FIG. 6a illustrates an example key tree 130 for blackout decryption keys, where each blackout decryption key corresponds to an audience of a different geographical region and is denoted by "!Region." It should be appreciated that content consumption devices may be associated with such regions based on any suitable criteria, such as a billing location for the subscription to which that device subscribes, etc. However, as another example, such a location may be a physical location of the content consumption device as provided via an IP address, Global Positioning System (GPS), etc.

As an example, a blackout decryption key associated with the Seattle audience may be represented by the "!Seattle" node within key tree 130. Since each audience is not provided with its own blackout decryption key, content consumption devices associated with the Seattle region are not served the !Seattle blackout decryption key, for example. However, content consumption devices associated with other regions (!Tacoma, !SanFrancisco, !SanDiego, !Denver, !Aspen, !Tucson and !Flagstaff) may each be served the !Seattle blackout decryption key.

As such, a content stream may be blocked to the Seattle audience by encrypting the content key encrypting the content stream with a blackout encryption key paired to the !Seattle blackout decryption key. Content is blocked to the Seattle audience because the Seattle audience does not receive their own key and thus cannot decrypt the content key and consume the stream. However, audiences other than Seattle do receive the !Seattle blackout decryption key, and thus can decrypt and consume content blocked to the Seattle region.

As a nonlimiting example, the content stream may correspond to a sports game which did not sell out in the Seattle region. As such, a provider may desire the content to be blocked to Seattle residents, yet be made available to other regions. In such a case, the content server may encrypt the content key encrypting the game with the !Seattle blackout encryption key, so as to limit decryption of the content to only those audiences having the paired !Seattle decryption key. Further, since the content server serves the encrypted stream with an embedded leaf license including the encrypted content key and policy, the server may make such a change to encryption and/or policy in real time, so as to support just-in-time blackouts.

In this way, blackouts can be granular yet may be limited by the intermediate decryption keys (e.g., channel keys, blackout keys, etc.) issued to clients ahead of time. In other words, a blackout may be triggered at essentially any time by changing the content key and/or the intermediate keys to which it is bound in order to exclude or include desired audiences; however, the clients associated with those audiences are predetermined (e.g., at the time that the license server served intermediate keys to the content consumption devices). Thus, each audience associated with a blackout decryption key is essentially a "candidate" to which content may be blocked.

Further yet, instead of serving a content consumption device of the Seattle audience with the seven other blackout decryption keys associated with the seven other candidate audiences, the license server may serve these keys via a scalable root license comprising blackout root keys from which the content consumption device can derive these seven keys. For example, in the case of the illustrated example, the blackout root key for !SanFrancisco and !SanDiego is a !California key. Likewise, the blackout root key for !Denver, !Aspen, !Tucson and !Flagstaff is a !Mountain key. As such, a content consumption device of the Seattle audience may be provided with just three blackout keys, namely the !Tacoma blackout decryption key, and the !California and !Mountain blackout root keys. In this way, just three keys are served to the client as opposed to seven. It should be appreciated that key tree 130 is nonlimiting, and a key tree may be organized in any suitable manner.

Further, as described above with respect to intermediate decryption keys, of which blackout decryption keys are an example, a content consumption device may derive one or more of decryption keys as needed from the root keys to decrypt and consume content. For example, if a Seattle user desires to watch content which is blocked to Tucson, the user's content consumption device may perform key derivation on its root keys to obtain the !Tucson blackout decryption key from the !Mountain root key.

Figure 6B:
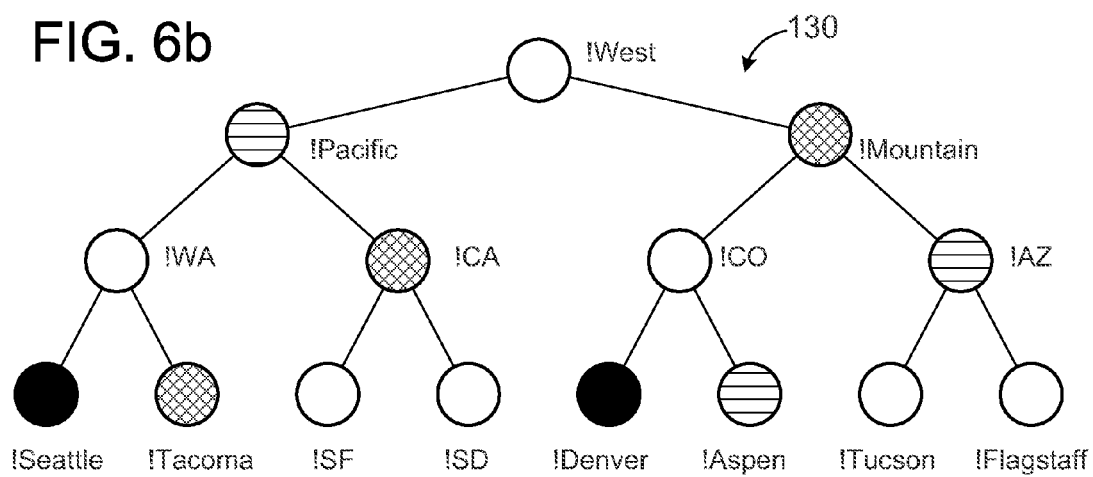

Further yet, it should be appreciated that content may be blocked to more than one audience in some embodiments. As such, a content key may be encrypted with two or more blackout encryption keys. FIG. 6b illustrates the example key tree 130 of FIG. 6a, wherein Seattle clients receive the !Tacoma, !California and !Mountain keys as described above. Likewise, Denver clients receive the !Aspen, !Arizona and !Pacific keys. To blackout content to both Seattle and Denver, the content key may be encrypted with both the !Seattle and !Denver keys. As such, clients having both keys (audiences other than Seattle and Denver, namely Tacoma, San Francisco, San Diego, Aspen, Tucson and Flagstaff) can decrypt and consume the content. Clients having only one of the keys (audiences of Seattle or Denver) cannot decrypt and consume the content.

It should be appreciated that a content key encrypted by two or more intermediate encryption keys (e.g., blackout encryption keys, channel keys, a combination of blackout encryption keys and channel keys, etc.) may be encrypted in any suitable manner. In some embodiments, the content key may be encrypted with each key. However, in some embodiments, two or more intermediate encryption keys may be mixed together, and the content key may then be encrypted with the mixed key. As a non-limiting example, such a mixed key may be created by mixing the bits of each intermediate encryption key.

It should also be appreciated that the one or more intermediate encryption keys encrypting the content key may be one or more intermediate root keys, in some embodiments. For example, if both Seattle and Tacoma were blacked out in the above-described example, then the !WA key may be used to encrypt the content key in place of the !Seattle and !Tacoma keys. As such, the overall number of keys clients derive may be reduced.

It should be further appreciated that the above-described blackout example is not limited to regional blackout encryption keys, and may include blackout encryption keys paired to blackout decryption keys associated with audiences based on any other suitable criteria, such as subscription levels, etc. As such, content may in some cases be blocked to exclude a particular region and a particular subscription level, for example.

Figure 7:
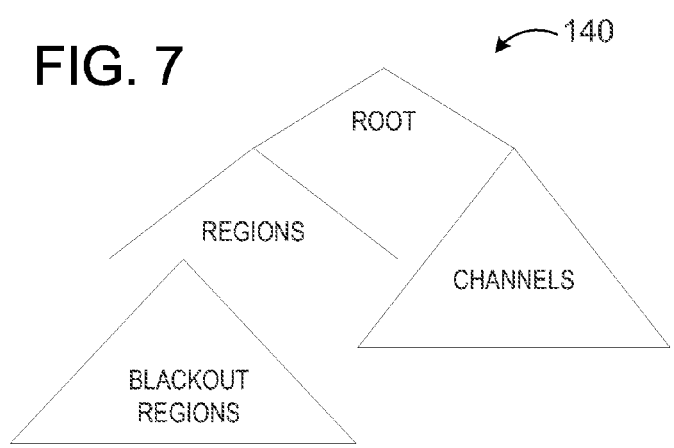
FIG. 7 shows yet another example hierarchical key tree in accordance with an embodiment of the present disclosure.

Further, the blackout decryption keys may be organized within a same key tree along with any other intermediate decryption keys. FIG. 7 illustrates such an example key tree 140, wherein intermediate keys associated with channels, regions, blackout regions, etc. are arranged in a binary tree structure. Such an organization may facilitate the scalability provided via the scalable licenses, etc. since all of the intermediate keys (e.g., for an IPTV system for a given time period) may be derived from a single root key (e.g., a single master key) using key derivation if the structure of the tree is known, such as how many channels there are, how many region sets and the number of regions in each set, etc. This structure may, for example, minimize the number of keys stored and served via the server. As a nonlimiting example, if a subscriber is to receive 64 "basic" channels, then the tree may be arranged such that one root key is served to the client from which the client can derive all 64 "basic" channel keys.

In particular, the herein-described blackout feature may take advantage of such a binary tree structure since each client is to receive blackout decryption keys for all other audiences except their own. Thus, for a system of N possible audiences, instead of serving a client N−1 blackout decryption keys, with key derivation such a client may instead be served far fewer keys (e.g., $\log_2$ (N) keys).

It should be appreciated that the herein described systems and methods are not limited to content streaming in an IPTV environment, but rather could be applied to other types of media. For example, content may be served via a delivery method such as HTTP-based streaming, wherein clients may perform GET requests for chunks of the streams based on a show index downloaded at the beginning of the stream. In another example, the herein-described encryption and scale techniques may be applied to a digital book presentation with regional restrictions (e.g., the content distributor has rights to distribute the book in the US, but is otherwise a global service). As yet another example, a user may have access to a large library of digital books that are requested via HTTP based on regional restrictions, etc.

In some embodiments, the above described methods and processes may be tied to a computing system including one or more computers. In particular, the methods and processes described herein may be implemented as a computer application, computer service, computer API, computer library, and/or other computer program product.

Figure 8:
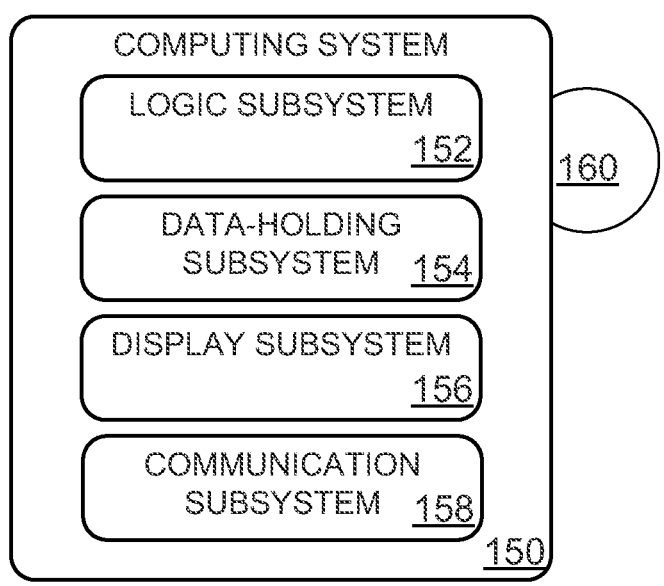
FIG. 8 shows an example computing system in accordance with an embodiment of the present disclosure.

FIG. 8 schematically shows a nonlimiting computing system 150 that may perform one or more of the above described methods and processes. Thus, computing system 150 may represent content server 22, license server 36 and/or any of content consumption devices 24. Computing system 150 is shown in simplified form. It is to be understood that virtually any computer architecture may be used without departing from the scope of this disclosure. In different embodiments, computing system 150 may take the form of a mainframe computer, server computer, desktop computer, laptop computer, tablet computer, home entertainment computer, network computing device, mobile computing device, mobile communication device, gaming device, etc.

Computing system 150 includes a logic subsystem 152 and a data-holding subsystem 154. Computing system 150 may optionally include a display subsystem 156, communication subsystem 158, and/or other components not shown in FIG. 8. Computing system 150 may also optionally include user input devices such as keyboards, mice, game controllers, cameras, microphones, and/or touch screens, for example.

Logic subsystem 152 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 154 may include one or more physical, non-transitory, devices configured to hold data and/or instructions executable by the logic subsystem to implement the herein described methods and processes. When such methods and processes are implemented, the state of data-holding subsystem 154 may be transformed (e.g., to hold different data).

Data-holding subsystem 154 may include removable media and/or built-in devices. Data-holding subsystem 154 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc), among others. Data-holding subsystem 154 may include devices with one or more of the following characteristics: volatile, nonvolatile, dynamic, static, read/write, read-only, random access, sequential access, location addressable, file addressable, and content addressable. In some embodiments, logic subsystem 152 and data-holding subsystem 154 may be integrated into one or more common devices, such as an application specific integrated circuit or a system on a chip.

FIG. 8 also shows an aspect of the data-holding subsystem in the form of removable computer-readable storage media 160, which may be used to store and/or transfer data and/or instructions executable to implement the herein described methods and processes. Removable computer-readable storage media 160 may take the form of CDs, DVDs, HD-DVDs, Blu-Ray Discs, EEPROMs, and/or floppy disks, among others.

It is to be appreciated that data-holding subsystem 154 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 150 that is implemented to perform one or more particular functions. In some cases, such a module, program, or engine may be instantiated via logic subsystem 152 executing instructions held by data-holding subsystem 154. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 156 may be used to present a visual representation of data held by data-holding subsystem 154. As the herein described methods and processes change the data held by the data-holding subsystem, and thus transform the state of the data-holding subsystem, the state of display subsystem 156 may likewise be transformed to visually represent changes in the underlying data. Display subsystem 156 may include one or more display devices utilizing virtually any type of technology. Such display devices may be combined with logic subsystem 152 and/or data-holding subsystem 154 in a shared enclosure, or such display devices may be peripheral display devices.

When included, communication subsystem 158 may be configured to communicatively couple computing system 150 with one or more other computing devices. Communication subsystem 158 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 150 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of streaming encrypted content from a content server computing system, the method comprising:

at the content server computing system, holding an encrypted content stream that is cryptographically encrypted from a content stream with a content key;

at the content server computing system, holding an encrypted content key that is cryptographically encrypted from the content key with one or more intermediate encryption keys; and from the content server computing system, serving the encrypted content stream to a plurality of content consumption devices via a computer network, at least one of the plurality of content consumption devices having a different scalable root license than another of the plurality of content consumption devices, the encrypted content stream embedded with a plurality of copies of a leaf license comprising the encrypted content key, the encrypted content stream cryptographically decryptable by a content consumption device having a scalable root license providing one or more intermediate root keys from which the content consumption device derives one or more intermediate decryption keys paired to the one or more intermediate encryption keys, the encrypted content stream not cryptographically decryptable by another content consumption device that does not have the scalable root license, and the plurality of copies of the leaf license temporally spaced-apart within the encrypted content stream to accommodate one or more of the plurality of content consumption devices just joining the encrypted content stream.

2. The method of claim 1, wherein the encrypted content stream is one of a plurality of encrypted content streams collectively constituting a channel, each encrypted content stream embedded with a leaf license comprising an encrypted content key corresponding to that encrypted content stream.

3. The method of claim 2, wherein each of the plurality of encrypted content streams of the channel is cryptographically encrypted with a same content key.

4. The method of claim 2, wherein each of the plurality of encrypted content streams of the channel is cryptographically encrypted with different content keys.

5. The method of claim 2, wherein the plurality of encrypted content streams includes at least one video stream and at least one corresponding audio stream.

6. The method of claim 5, wherein the plurality of encrypted content streams further includes a second audio stream.

7. The method of claim 5, wherein the plurality of encrypted content streams further includes a second video stream.

8. The method of claim 1, further comprising changing the one or more intermediate encryption keys cryptographically encrypting the content key to form an updated encrypted content key and serving the encrypted content stream embedded with an updated leaf license comprising the updated encrypted content key.

9. The method of claim 8, wherein the encrypted content stream is embedded with the updated leaf license in addition to the leaf license.

10. A method of streaming encrypted content from a content server computing system, the method comprising:

at the content server computing system, holding an encrypted content stream that is cryptographically encrypted from a content stream with a content key;

at the content server computing system, holding an encrypted content key that is cryptographically encrypted from the content key with one or more intermediate encryption keys; and from the content server computing system, serving the encrypted content stream to a plurality of content consumption devices via a computer network, at least one of the plurality of content consumption devices having a different scalable root license than another of the plurality of content consumption devices, the encrypted content stream embedded with a plurality of copies of a leaf license comprising the encrypted content key, the encrypted content stream cryptographically decryptable by a content consumption device having a scalable root license providing one or more intermediate root keys from which the content consumption device derives one or more intermediate decryption keys paired to the one or more intermediate encryption keys, the one or more intermediate decryption keys being related to the one or more intermediate root keys via a hierarchical key tree having a binary tree structure, the encrypted content stream not cryptographically decryptable by another content consumption device that does not have the scalable root license, and the plurality of copies of the leaf license temporally spaced-apart within the encrypted content stream to accommodate one or more of the plurality of content consumption devices just joining the encrypted content stream.

11. The method of claim 10, wherein the encrypted content stream is one of a plurality of encrypted content streams collectively constituting a channel, each encrypted content stream embedded with a leaf license comprising an encrypted content key corresponding to that encrypted content stream.

12. The method of claim 11, wherein each of the plurality of encrypted content streams of the channel is cryptographically encrypted with a same content key.

13. The method of claim 11, wherein each of the plurality of encrypted content streams of the channel is cryptographically encrypted with different content keys.

14. The method of claim 11, wherein the plurality of encrypted content streams includes at least one video stream and at least one corresponding audio stream.

15. The method of claim 14, wherein the plurality of encrypted content streams further includes a second audio stream.

16. The method of claim 14, wherein the plurality of encrypted content streams further includes a second video stream.

17. The method of claim 10, further comprising changing the one or more intermediate encryption keys cryptographically encrypting the content key to form an updated encrypted content key and serving the encrypted content stream embedded with an updated leaf license comprising the updated encrypted content key.

18. The method of claim 17, wherein the encrypted content stream is embedded with the updated leaf license in addition to the leaf license.

19. A method of streaming encrypted content from a content server computing system, the method comprising:

holding a plurality of encrypted content streams each cryptographically encrypted from a corresponding content stream with a corresponding content key, the plurality of encrypted content streams collectively constituting a channel;

for each encrypted content stream, holding an encrypted content key that is cryptographically encrypted from the corresponding content key with one or more intermediate encryption keys; and from the content server computing system, serving one or more of the plurality of encrypted content streams to a plurality of content consumption devices via a computer network, at least one of the plurality of content consumption devices having a different scalable root license than another of the plurality of content consumption devices, each of the one or more encrypted content streams embedded with a leaf license comprising an encrypted content key corresponding to that encrypted content stream, each such encrypted content stream cryptographically decryptable by a content consumption device having a scalable root license providing one or more intermediate root keys from which the content consumption device derives one or more intermediate decryption keys paired to the one or more intermediate encryption keys, each such encrypted content stream not cryptographically decryptable by another content consumption device that does not have the scalable root license.

\* \* \* \* \*